(12) United States Patent
An (10) Patent No.: US 11,944,129 B2
(45) Date of Patent: Apr. 2, 2024

(54) OPTICAL MODULE AND AEROSOL GENERATING DEVICE INCLUDING THE SAME

(71) Applicant: KT&G CORPORATION, Daejeon (KR)

(72) Inventor: Hwi Kyeong An, Seoul (KR)

(73) Assignee: KT&G CORPORATION, Daejeon (KR)

( * ) Notice: Subject to any disclaimer, the term of this patent is extended or adjusted under 35 U.S.C. 154(b) by 513 days.

(21) Appl. No.: 17/286,916

(22) PCT Filed: Jun. 11, 2020

(86) PCT No.: PCT/KR2020/007569
§ 371 (c)(1),
(2) Date: Apr. 20, 2021

(87) PCT Pub. No.: WO2020/251272
PCT Pub. Date: Dec. 17, 2020

(65) Prior Publication Data
US 2021/0352968 A1 Nov. 18, 2021

(30) Foreign Application Priority Data
Jun. 14, 2019 (KR) .................. 10-2019-0071061

(51) Int. Cl.
*A24F 40/60* (2020.01)
*A24F 40/57* (2020.01)
(Continued)

(52) U.S. Cl.
CPC .............. *A24F 40/60* (2020.01); *A24F 40/57* (2020.01); *G02B 5/0215* (2013.01);
(Continued)

(58) Field of Classification Search
CPC ........ A24F 40/60; A24F 40/57; G06F 3/0421; G06F 2203/04109; G02B 5/0215; G02B 19/009; G02B 19/0009
(Continued)

(56) References Cited

U.S. PATENT DOCUMENTS 8,351,744 B2  1/2013  Travis et al.
9,439,455 B2  9/2016  Alarcon et al.
(Continued)

FOREIGN PATENT DOCUMENTS

CN   101751186 A   6/2010
CN   201698384 U   1/2011
(Continued)

OTHER PUBLICATIONS

Chinese Office Action dated Apr. 28, 2023 in Chinese Application No. 202080007367.X.
(Continued)

*Primary Examiner* — Gary F Paumen
(74) *Attorney, Agent, or Firm* — Sughrue Mion, PLLC (57) ABSTRACT

An optical module includes: an infrared light emitter configured to emit infrared light; an infrared light receiver configured to receive the infrared light emitted from the infrared light emitter and generate a signal based on an amount of the received infrared light; a touch interface arranged between the infrared light emitter and the infrared light receiver, and configured to reflect the infrared light emitted from the infrared light emitter toward the infrared light receiver, and change an amount of the reflected infrared light as a touch input occurs; and a visible light emitter configured to emit visible light toward the touch interface such that the visible light is emitted outside the optical module by passing through the touch interface.

15 Claims, 9 Drawing Sheets

(51) Int. Cl.
    *G02B 5/02* (2006.01)
    *G02B 19/00* (2006.01)
    *G06F 3/042* (2006.01)
(52) U.S. Cl.
    CPC ....... *G02B 19/0009* (2013.01); *G02B 19/009* (2013.01); *G06F 3/0421* (2013.01); *G06F 2203/04109* (2013.01)
(58) Field of Classification Search
    USPC .................................................. 131/329
    See application file for complete search history.

(56) References Cited

U.S. PATENT DOCUMENTS

| | | | |
|---|---|---|---|
| 10,838,556 B2* | 11/2020 | Yeke Yazdandoost | ............... H10K 50/841 |
| 2010/0271334 A1 | 10/2010 | Yuan | |
| 2011/0157092 A1 | 6/2011 | Yang | |
| 2011/0265806 A1 | 11/2011 | Alarcon et al. | |
| 2012/0200531 A1 | 8/2012 | Araki | |
| 2012/0206937 A1 | 8/2012 | Travis et al. | |
| 2013/0062180 A1 | 3/2013 | Uenomachi et al. | |
| 2015/0216236 A1* | 8/2015 | Bless | .............. B23K 26/20  131/328 |
| 2015/0245664 A1 | 9/2015 | Memari et al. | |
| 2015/0245666 A1 | 9/2015 | Memari et al. | |
| 2016/0021930 A1* | 1/2016 | Minskoff | ................ A24F 40/51  392/395 |
| 2016/0050975 A1* | 2/2016 | Worm | .................... A24F 40/95  131/328 |
| 2016/0216712 A1* | 7/2016 | Baumgartner | ............ A61L 2/24 |
| 2016/0338408 A1* | 11/2016 | Guenther, Jr. | .......... B23P 19/10 |
| 2017/0099877 A1* | 4/2017 | Worm | ............... A61M 15/0023 |
| 2017/0150757 A1* | 6/2017 | Worm | ................. H05B 1/0244 |
| 2017/0372152 A1 | 12/2017 | Baek et al. | |
| 2018/0140021 A1 | 5/2018 | Alarcon et al. | |
| 2018/0146712 A1 | 5/2018 | Alarcon et al. | |
| 2018/0275865 A1 | 9/2018 | Frojdh et al. | |
| 2018/0296777 A1* | 10/2018 | Terry | ................... A61M 11/042 |
| 2020/0359681 A1 | 11/2020 | Han et al. | |

FOREIGN PATENT DOCUMENTS

| | | |
|---|---|---|
| CN | 201796564 U | 4/2011 |
| CN | 102622133 A | 8/2012 |
| CN | 102622135 A | 8/2012 |
| CN | 102722295 A | 10/2012 |
| CN | 102741791 A | 10/2012 |
| CN | 102812424 A | 12/2012 |
| CN | 202694301 U | 1/2013 |
| CN | 102915161 A | 2/2013 |
| CN | 103558949 A | 2/2014 |
| CN | 203812216 U | 9/2014 |
| CN | 204178349 U | 2/2015 |
| CN | 104679346 A | 6/2015 |
| CN | 105404434 A | 3/2016 |
| CN | 109379879 A | 2/2019 |
| JP | 2006-120393 A | 5/2006 |
| JP | 2010-152860 A | 7/2010 |
| JP | 2011-096208 A | 5/2011 |
| JP | 2013-58117 A | 3/2013 |
| JP | 2013-524835 A | 6/2013 |
| KR | 10-2011-0072941 A | 6/2011 |
| KR | 10-2012-0049890 A | 5/2012 |
| KR | 10-2014-0136098 A | 11/2014 |
| KR | 10-1634805 B1 | 6/2016 |
| KR | 10-2017-0080111 A | 7/2017 |
| KR | 10-2018-0021486 A | 6/2018 |
| KR | 10-2019-0049402 A | 5/2019 |
| WO | 2011/052789 A1 | 5/2011 |
| WO | 2017/116116 A1 | 7/2017 |

OTHER PUBLICATIONS

Korea Intellectual Property Office Notice of Non-Final Rejection for KR 10-2019-0071061 dated Sep. 14, 2020.
Korea Intellectual Property Office Notice of Last Non-Final Rejection for KR 10-2019-0071061 dated Nov. 26, 2020.
International Search Report for PCT/KR2020/007569 dated Sep. 11, 2020 [PCT/ISA/210].
Written Opinion for PCT/KR2020/007569 dated Sep. 11, 2020 [PCT/ISA/237].
Extended European Search Report dated Oct. 22, 2021 in European Application No. 20823512.7.
Office Action dated Jun. 14, 2022 from the Japanese Patent Office in JP Application No. 2021-529330.
Japanese Office Action dated Oct. 11, 2022 in Japanese Patent Application No. 2021-529330.
Chinese Office Action dated Sep. 26, 2023 in Application No. 202080007367.X.

* cited by examiner

OPTICAL MODULE AND AEROSOL GENERATING DEVICE INCLUDING THE SAME

CROSS REFERENCE TO RELATED APPLICATIONS

This application is a National Stage of International Application No. PCT/KR2020/007569 filed Jun. 11, 2020, claiming priority based on Korean Patent Application No. 10-2019-0071061 filed Jun. 14, 2019.

TECHNICAL FIELD

One or more embodiments relate to an optical module and an aerosol generating device including the same, and more particularly, to an optical module capable of receiving a touch input by using infrared light and performing a display function by using visible light, and an aerosol generating device including the same.

BACKGROUND ART

Recently, a touch-type input method is widely used to implement pointing devices, input devices, or the like in electronic devices such as computers. Touch-type input devices may be embodied as capacitive types, resistive film types, ultrasonic types, infrared types, and the like and have been widely used in computers, cellular phones, monitors, and various types of portable devices.

In the related art, a capacitive type device may recognize an input even if a user's skin (e.g., a finger) does not directly touch the device. Therefore, when a device is in a pocket, and a distance between the skin and the device is within a recognizable range, even a thin cloth between the skin and the device may cause a change in the amount of charge, thereby generating an unintended input.

Since a resistive film type device requires a physical operation distance, it may be more convenient to use a physical key or button.

Also, since an ultrasonic type device is vulnerable to noise and moisture, a device may be likely to malfunction in certain circumstances and may not operate due to pollutants.

DISCLOSURE OF INVENTION

Solution to Problem

According to one or more embodiments, an optical module includes: an infrared light emitter configured to emit infrared light; an infrared light receiver configured to receive the infrared light emitted from the infrared light emitter and generate a signal based on an amount of the received infrared light; a touch interface arranged between the infrared light emitter and the infrared light receiver, and configured to reflect the infrared light emitted from the infrared light emitter toward the infrared light receiver, and change an amount of the reflected infrared light as a touch input occurs; and a visible light emitter configured to emit visible light toward the touch interface such that the visible light is emitted outside the optical module by passing through the touch interface.

Advantageous Effects of Invention

Since an optical module according to one or more embodiments is capable of recognizing a touch input using infrared light, malfunction may be prevented. In addition, a touch interface receiving a touch input may also display the status of aerosol generating device using visible light.

The effects according to one or embodiments are not limited to the effects described above, and unmentioned effects will be clearly understood by one of ordinary skill in the art from the present specification and the accompanying drawings.

BEST MODE FOR CARRYING OUT THE INVENTION

According to one or more embodiments, an optical module includes: an infrared light emitter configured to emit infrared light; an infrared light receiver configured to receive the infrared light emitted from the infrared light emitter and generate a signal based on an amount of the received infrared light; a touch interface arranged between the infrared light emitter and the infrared light receiver, and configured to reflect the infrared light emitted from the infrared light emitter toward the infrared light receiver, and change an amount of the reflected infrared light as a touch input occurs; and a visible light emitter configured to emit visible light toward the touch interface such that the visible light is emitted outside the optical module by passing through the touch interface.

The optical module may further include a light transmitter configured to guide the infrared light emitted from the infrared light emitter and the infrared light reflected from the touch interface.

The light transmitter may include: a diffuser including a lens surface configured to diffuse the infrared light emitted from the infrared light emitter; a path changer configured to guide the diffused infrared light toward the touch interface, and guide the infrared light reflected from the touch interface toward the infrared light receiver; and a condenser including a lens surface configured to condense the infrared light reflected from the touch interface and guided by the path changer.

The touch interface may have a shape with a long axis extending in a direction in which the infrared light emitted from the infrared light emitter is diffused by the diffuser.

The path changer may include an infrared reflection surface configured to change, through reflection, a travel path of the infrared light emitted from the infrared light emitter through reflection.

A surface of the touch interface, the lens surface of the diffuser, the lens surface of the condenser, and the infrared reflection surface of the path changer have surface roughness Ra equal to or less than 1.

The optical module may further include visible light transmitter configured to guide visible light emitted from the visible light emitter toward the touch interface.

The visible light transmitter may include a visible light reflection surface configured to reflect the visible light emitted from the visible light emitter, and a visible light lens surface configured to diffuse the visible light reflected from the visible light reflection surface.

An incidence angle of infrared light incident on the touch interface may be greater than a critical angle for total internal reflection, and an incidence angle of visible light incident on the touch interface is smaller than the critical angle.

According to one or more embodiments, an aerosol generating device generates aerosol from an aerosol generating article and includes the optical module according to the embodiments described above.

The aerosol generating device may further include a housing forming an exterior of the aerosol generating device, wherein the touch interface is exposed on an outer surface of the housing.

The aerosol generating device may further include: a heater heating the aerosol generating article; a battery supplying power to the heater; and a controller controlling power supplied to the heater to preheat the heater and controls the touch interface to emit visible light of a preset color.

The controller may control the touch interface to change the color of the visible light emitted from the touch interface when preheating of the heater is completed.

MODE FOR THE INVENTION

With respect to the terms in the various embodiments, the general terms which are currently and widely used are selected in consideration of functions of structural elements in the various embodiments of the present disclosure. However, meanings of the terms can be changed according to intention, a judicial precedence, the appearance of a new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

An aerosol generating device may be a device that generates an aerosol by using an aerosol generating material to generate an aerosol that may be directly inhaled into the lugs of a user through the mouth of the user. For example, the aerosol generating device may be a holder.

As used herein, the word "puff" may refer to the inhalation of the user, and the inhalation may refer to an act of the mouth or nose of the user pulling air or other substances into the mouth, nasal cavity, or lugs.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

Hereinafter, embodiments of the present disclosure will be described in detail with reference to the drawings.

Figure 1:
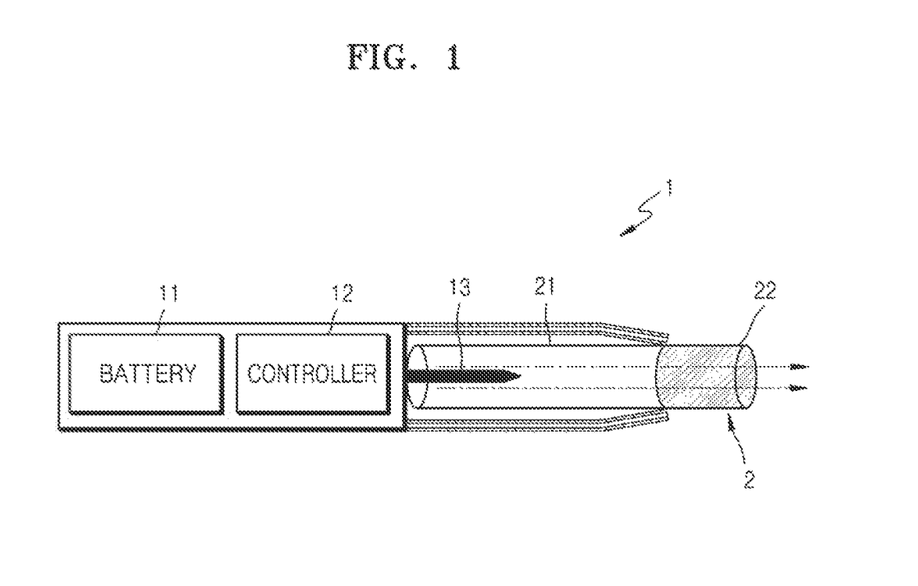
FIGS. 1 through 3 are diagrams illustrating examples in which a cigarette is inserted into an aerosol generating device according to an embodiment.
Figure 2:
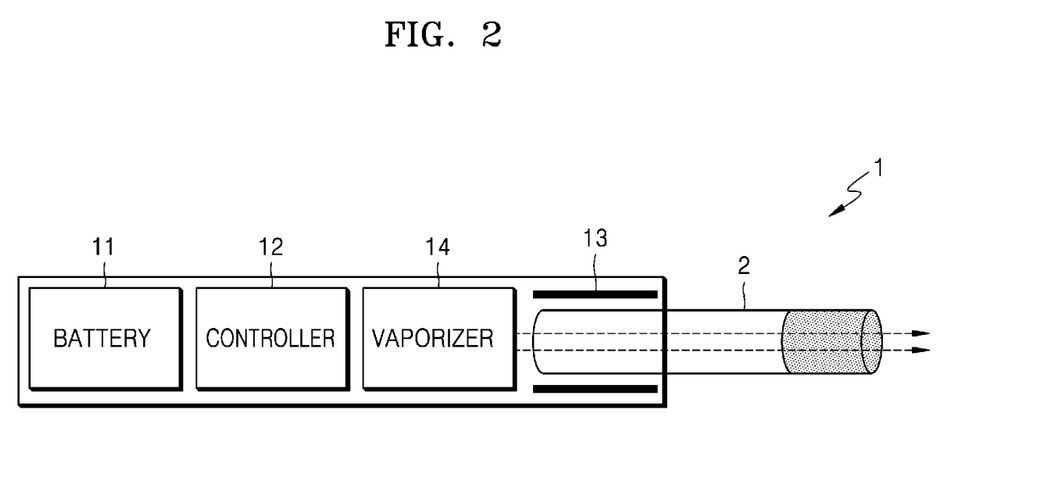
Figure 3:
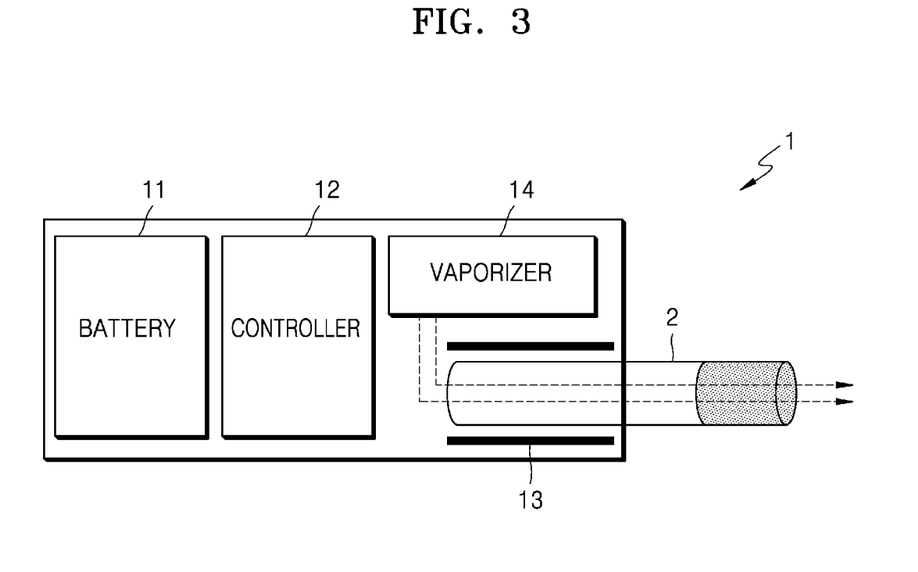

FIGS. 1 through 3 are diagrams showing examples in which a cigarette is inserted into an aerosol generating device.

Referring to FIG. 1, the aerosol generating device 1 may include a battery 11, a controller 12, and a heater 13. Referring to FIGS. 2 and 3, the aerosol generating device 1 may further include a vaporizer 14. Also, the cigarette 2 may be inserted into an inner space of the aerosol generating device 1.

FIGS. 1 through 3 illustrate components of the aerosol generating device 1, which are related to the present embodiment. Therefore, it will be understood by one of ordinary skill in the art related to the present embodiment that other components may be further included in the aerosol generating device 1, in addition to the components illustrated in FIGS. 1 through 3.

FIG. 1 illustrates that the battery 11, the controller 12, and the heater 13 are arranged in series. Also, FIG. 2 illustrates that the battery 11, the controller 12, the vaporizer 14, and the heater 13 are arranged in series. Also, FIG. 3 illustrates that the vaporizer 14 and the heater 13 are arranged in parallel. However, the internal structure of the aerosol generating device 1 is not limited to the structures illustrated in FIGS. 1 through 3. In other words, according to the design of the aerosol generating device 1, the battery 11, the controller 12, the heater 13, and the vaporizer 14 may be differently arranged.

When the cigarette 2 is inserted into the aerosol generating device 1, the aerosol generating device 1 may operate the heater 13 and/or the vaporizer 14 to generate an aerosol from the cigarette 2 and/or the vaporizer 14. The aerosol generated by the heater 13 and/or the vaporizer 14 is delivered to a user by passing through the cigarette 2.

As necessary, even when the cigarette 2 is not inserted into the aerosol generating device 1, the aerosol generating device 1 may heat the heater 13.

The battery 11 may supply power to be used for the aerosol generating device 1 to operate. For example, the battery 11 may supply power to heat the heater 13 or the vaporizer 14, and may supply power for operating the controller 12. Also, the battery 11 may supply power for operations of a display, a sensor, a motor, etc. mounted in the aerosol generating device 1. For example, the battery 11 may be a lithium ion battery, a nickel-based battery (e.g., a nickel-metal hybrid battery or a nickel-cadmium battery), or a lithium-based battery (e.g., a lithium-cobalt battery, a lithium-phosphate battery, a lithium titanate battery, or a lithium-polymer battery).

The controller 12 may generally control operations of the aerosol generating device 1. In detail, the controller 12 may control not only operations of the battery 11, the heater 13, and the vaporizer 14, but also operations of other components included in the aerosol generating device 1. Also, the controller 12 may check a state of each of the components of the aerosol generating device 1 to determine whether or not the aerosol generating device 1 is able to operate.

The controller 12 may include at least one processor. A processor can be implemented as an array of a plurality of logic gates or can be implemented as a combination of a microprocessor and a memory in which a program executable in the microprocessor is stored. It will be understood by one of ordinary skill in the art that the processor can be implemented in other forms of hardware.

The heater 13 may be heated by the power supplied from the battery 11. For example, when the cigarette 2 is inserted into the aerosol generating device 1, the heater 13 may be located outside the cigarette 2. Thus, the heated heater 13 may increase a temperature of an aerosol generating material in the cigarette 2.

The heater 13 may include an electro-resistive heater. For example, the heater 13 may include an electrically conductive track, and the heater 13 may be heated when currents flow through the electrically conductive track. However, the heater 13 is not limited to the example described above and may include all heaters which may be heated to a desired temperature. Here, the desired temperature may be pre-set in the aerosol generating device 1 or may be set as a temperature desired by a user.

As another example, the heater 13 may include an induction heater. In detail, the heater 13 may include an electrically conductive coil for heating a cigarette in an induction heating method, and the cigarette may include a susceptor which may be heated by the induction heater.

For example, the heater 13 may include a tube-type heating element, a plate-type heating element, a needle-type heating element, or a rod-type heating element, and may heat the inside or the outside of the cigarette 2, according to the shape of the heating element.

Also, the aerosol generating device 1 may include a plurality of heaters 13. Here, the plurality of heaters 13 may be inserted into the cigarette 2 or may be arranged outside the cigarette 2. Also, some of the plurality of heaters 13 may be inserted into the cigarette 2 and the others may be arranged outside the cigarette 2. In addition, the shape of the heater 13 is not limited to the shapes illustrated in FIGS. 1 through 3 and may include various shapes.

The vaporizer 14 may generate aerosol by heating a liquid composition and the generated aerosol may pass through the cigarette 2 to be delivered to a user. In other words, the aerosol generated via the vaporizer 14 may move along an air flow passage of the aerosol generating device 1 and the air flow passage may be configured such that the aerosol generated via the vaporizer 14 passes through the cigarette 2 to be delivered to the user.

For example, the vaporizer 14 may include a liquid storage, a liquid delivery element, and a heating element, but it is not limited thereto. For example, the liquid storage, the liquid delivery element, and the heating element may be included in the aerosol generating device 1 as independent modules.

The liquid storage may store a liquid composition. For example, the liquid composition may be a liquid including a tobacco-containing material having a volatile tobacco flavor component, or a liquid including a non-tobacco material. The liquid storage may be formed to be detachable from the vaporizer 14 or may be formed in-tegrally with the vaporizer 14.

For example, the liquid composition may include water, a solvent, ethanol, plant extract, spices, flavorings, or a vitamin mixture. The spices may include menthol, peppermint, spearmint oil, and various fruit-flavored ingredients, but are not limited thereto. The flavorings may include ingredients capable of providing various flavors or tastes to a user. Vitamin mixtures may be a mixture of at least one of vitamin A, vitamin B, vitamin C, and vitamin E, but are not limited thereto. Also, the liquid composition may include an aerosol forming substance, such as glycerin and propylene glycol.

The liquid delivery element may deliver the liquid composition of the liquid storage to the heating element. For example, the liquid delivery element may be a wick such as cotton fiber, ceramic fiber, glass fiber, or porous ceramic, but is not limited thereto.

The heating element is an element for heating the liquid composition delivered by the liquid delivery element. For example, the heating element may be a metal heating wire, a metal hot plate, a ceramic heater, or the like, but is not limited thereto. In addition, the heating element may include a conductive filament such as nichrome wire and may be positioned as being wound around the liquid delivery element. The heating element may be heated by a current supply and may transfer heat to the liquid composition in contact with the heating element, thereby heating the liquid composition. As a result, aerosol may be generated.

For example, the vaporizer 14 may be referred to as a cartomizer or an atomizer, but it is not limited thereto.

The aerosol generating device 1 may include other components in addition to the battery 11, the controller 12, the heater 13, and the vaporizer 14. For example, the aerosol generating device 1 may include a display capable of outputting visual information and/or a motor for outputting haptic information. Also, the aerosol generating device 1 may include at least one sensor (e.g., a puff detecting sensor, a temperature detecting sensor, a cigarette insertion detecting sensor, etc.). Also, the aerosol generating device 1 may be formed such that external air may be introduced or internal air may be discharged while the cigarette 2 is inserted.

Although not illustrated in FIGS. 1 through 3, the aerosol generating device 1 and an additional cradle may form together a system. For example, the cradle may be used to charge the battery 11 of the aerosol generating device 1. Alternatively, the heater 13 may be heated when the cradle and the aerosol generating device 1 are coupled to each other.

The cigarette 2 may be similar as a general combustive cigarette. For example, the cigarette 2 may be divided into a first portion including an aerosol generating material and a second portion including a filter, etc. Alternatively, the second portion of the cigarette 2 may also include an aerosol generating material. For example, an aerosol generating material made in the form of granules or capsules may be inserted into the second portion.

The entire first portion may be inserted into the aerosol generating device 1, and the second portion may be exposed to the outside. Alternatively, only a portion of the first portion may be inserted into the aerosol generating device 1. Otherwise, the entire first portion and a portion of the second portion may be inserted into the aerosol generating device 1. The user may puff aerosol while holding the second portion by the mouth of the user. In this case, the aerosol is generated by the external air passing through the first portion, and the generated aerosol passes through the second portion and is delivered to the user's mouth.

For example, the external air may flow into at least one air passage formed in the aerosol generating device 1. For example, the opening and closing and/or a size of the air passage formed in the aerosol generating device 1 may be adjusted by the user. Accordingly, the amount of smoke and a smoking impression may be adjusted by the user. As another example, the external air may flow into the cigarette 2 through at least one hole formed in a surface of the cigarette 2.

Hereinafter, an example of the cigarette 2 will be described with reference to FIG. 4.

Figure 4:
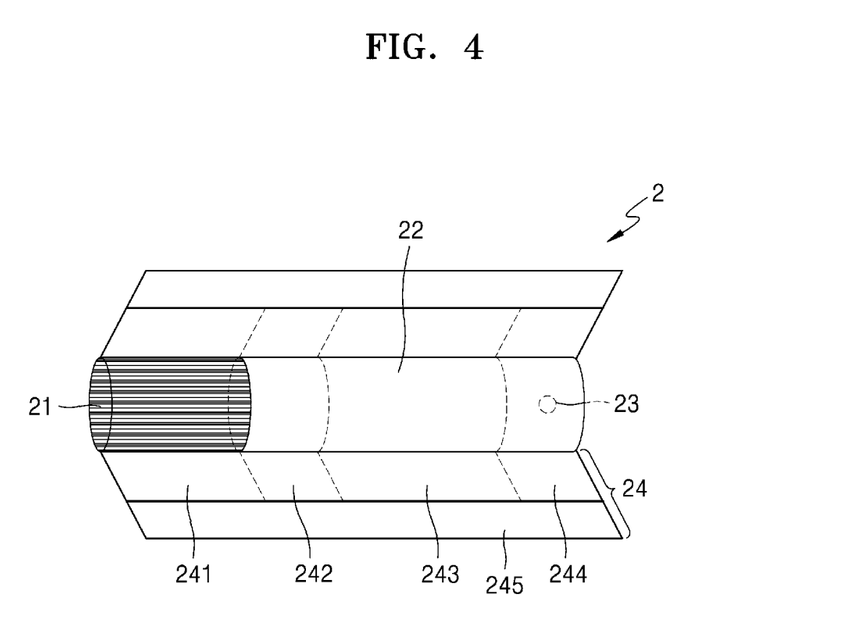
FIG. 4 is an exploded view illustrating an embodiment of the cigarette illustrated in FIG. 1.

Referring to FIG. 4, the cigarette 2 may include a tobacco rod 21 and a filter rod 22. The first portion 21 described above with reference to FIGS. 1 through 3 may include the tobacco rod, and the second portion may include the filter rod 22.

FIG. 4 illustrates that the filter rod 22 includes a single segment. However, the filter rod 22 is not limited thereto. In other words, the filter rod 22 may include a plurality of segments. For example, the filter rod 22 may include a first segment configured to cool an aerosol and a second segment configured to filter a certain component included in the aerosol. Also, as necessary, the filter rod 22 may further include at least one segment configured to perform other functions.

The cigarette 2000 may be packaged by at least one wrapper 24. The wrapper 24 may have at least one hole through which external air may be introduced or internal air may be discharged. For example, the cigarette 2 may be packaged by one wrapper 24. As another example, the cigarette 2 may be doubly packaged by at least two wrappers 24. For example, the tobacco rod 21 may be packaged by a first wrapper, and the filter rod 22 may be packaged by a second wrapper. Also, the tobacco rod 21 and the filter rod 22, which are respectively packaged by separate wrappers, may be coupled to each other, and the entire cigarette 2 may be packaged by a third wrapper. When each of the tobacco rod 21 and the filter rod 22 includes a plurality of segments, each segment may be packaged by a separate wrapper.

The tobacco rod 21 may include an aerosol generating material. For example, the aerosol generating material may include at least one of glycerin, propylene glycol, ethylene glycol, dipropylene glycol, diethylene glycol, triethylene glycol, tetraethylene glycol, and oleyl alcohol, but it is not limited thereto. Also, the tobacco rod 21 may include other additives, such as flavors, a wetting agent, and/or organic acid. Also, the tobacco rod 21 may include a flavored liquid, such as menthol or a moisturizer, which is injected to the tobacco rod 21.

The tobacco rod 21 may be manufactured in various forms. For example, the tobacco rod 21 may be formed as a sheet or a strand. Also, the tobacco rod 21 may be formed as a pipe tobacco, which is formed of tiny bits cut from a tobacco sheet.

Also, the tobacco rod 21 may be surrounded by a heat conductive material. For example, the heat-conducting material may be, but is not limited to, a metal foil such as aluminum foil. For example, the heat conductive material surrounding the tobacco rod 21 may uniformly distribute heat transmitted to the tobacco rod 21, and thus, the heat conductivity of the tobacco rod may be increased and taste of the tobacco may be improved. Also, the heat conductive material surrounding the tobacco rod 21 may function as a susceptor heated by the induction heater. Here, although not illustrated in the drawings, the tobacco rod 21 may further include an additional susceptor, in addition to the heat conductive material surrounding the tobacco rod 21.

The filter rod 22 may include a cellulose acetate filter. Shapes of the filter rod 22 are not limited. For example, the filter rod 22 may include a cylinder-type rod or a tube-type rod having a hollow inside. Also, the filter rod 22 may include a recess-type rod. When the filter rod 22 includes a plurality of segments, at least one of the plurality of segments may have a different shape.

The filter rod 22 may be formed to generate flavors. For example, a flavoring liquid may be injected onto the filter rod 22, or an additional fiber coated with a flavoring liquid may be inserted into the filter rod 22.

Also, the filter rod 22 may include at least one capsule 23. Here, the capsule 23 may generate a flavor or an aerosol. For example, the capsule 23 may have a configuration in which a liquid containing a flavoring material is wrapped with a film. For example, the capsule 23 may have a spherical or cylindrical shape, but is not limited thereto.

The filter rod 22 may include a segment configured to cool the aerosol, the cooling segment may include a polymer material or a biodegradable polymer material. For example, the cooling segment may include pure polylactic acid alone, but the material for forming the cooling segment is not limited thereto. In some embodiments, the cooling segment may include a cellulose acetate filter having a plurality of holes. However, the cooling segment is not limited to the above-described example and any cooling elements capable of cooling the aerosol may be used.

Although not illustrated in FIG. 4, the cigarette 2 according to an embodiment may further include a front-end filter. The front-end filter may be located on a side of the tobacco rod 21, the side not facing the filter rod 22. The front-end filter may prevent the tobacco rod 21 from being detached outwards and prevent the liquefied aerosol from flowing into the aerosol generating device 1 from the tobacco rod 21, during smoking.

Figure 5:
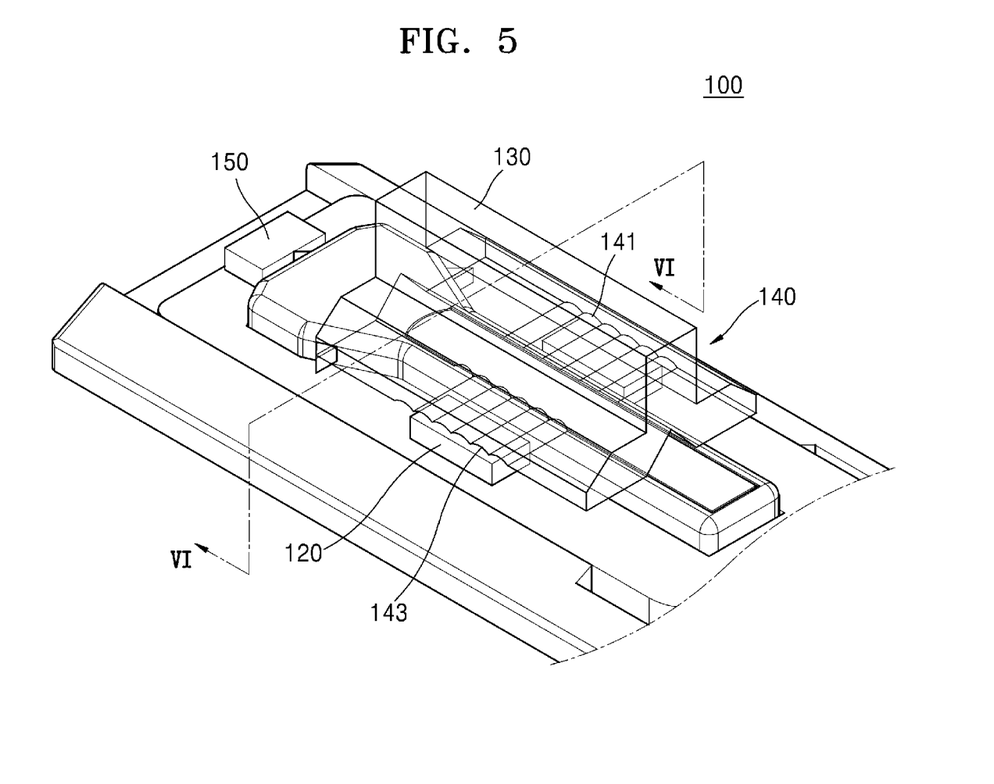
FIG. 5 is a perspective view schematically illustrating an optical module according to some embodiments.
Figure 6:
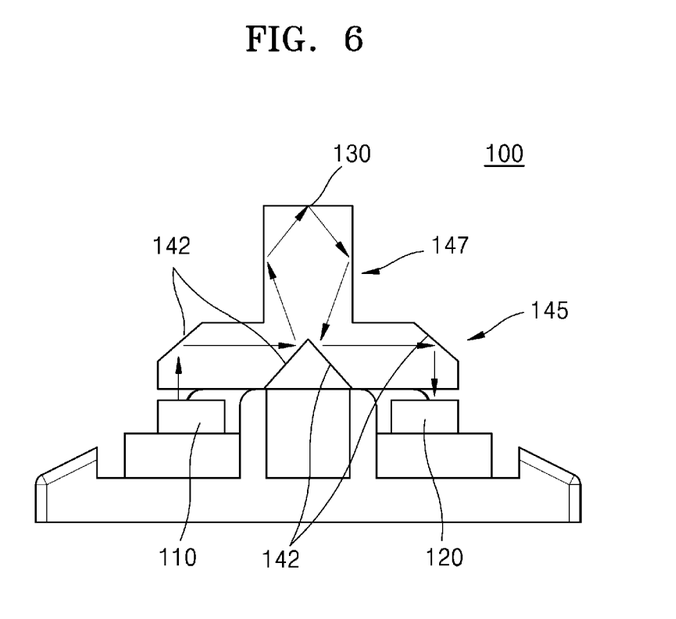
FIG. 6 is a cross-sectional view of the optical module according to the embodiments illustrated in FIG. 5, taken along line VI-VI of FIG. 5.

FIG. 5 is a perspective view schematically illustrating an optical module according to an embodiment, and FIG. 6 is a cross-sectional view of an optical module illustrated in FIG. 5, taken along line VI-VI of FIG. 5.

Referring to FIGS. 5 and 6, an optical module 100 may include an infrared light emitter 110, an infrared light receiver 120, a touch unit (i.e., touch interface) 130, a light transmitter 140, and a visible light emitter 150.

The light transmitter 140 may comprise a base 145 extending between the infrared light emitter 110 and the infrared receiver 120 and a protruding part 147 protruding upward from the base 145. The touch interface 130 may be disposed on the upper surface of the protruding part 147. The touch interface 130 may be exposed to the outside and may easily receive a touch input from a user.

In FIGS. 5 and 6, the base 145 and the protruding part 147 are illustrated as different parts of one-piece body, but embodiments are not limited thereto. For example, the base 145 and the protruding part 147 may be independent components that are manufactured separately and combined together for use according to embodiments.

The infrared light emitter 110 emits infrared light, and the infrared light receiver 120 receives at least a portion of the infrared light emitted from the infrared light emitter 110. The infrared light receiver 120 generates a signal on the basis of the amount of infrared light that is received, and thereby a change in the amount of the infrared light traveling from the infrared light emitter 110 to the infrared light receiver 120 may be detected.

The touch unit 130 is arranged between the infrared light emitter 110 and the infrared light receiver 120. The touch unit 130 reflects at least a portion of the infrared light emitted from the infrared light emitter 110, and the reflected infrared light is received by the infrared light receiver 120. The touch unit 130 reflects the infrared light at a preset ratio with respect to an external medium (e.g., air). For example, the touch unit 130 may have a greater refractive index than air, and thus, infrared light incident on the touch unit 130 is totally reflected from the touch unit 130. Here, when an external object (e.g., a finger of a user) contacts the touch unit 130, the touch unit 130 contacting the finger instantaneously changes a total internal reflection condition because an external medium becomes the finger, not air. As a result, compared to infrared light reflected before a touch occurs, the amount of infrared light transmitted to the outside increases. Therefore, when a touch occurs on the touch unit 130, the amount of infrared light received by the infrared light receiver 120 is changed compared to before the touch occurs.

The visible light receiver 150 emits visible light. Since the visible light passes through the touch unit 130 and is emitted to the outside, the touch unit 130 performs a display function of the aerosol generating device 1. Therefore, in the aerosol generating device 1 according to the embodiment described above, the touch unit 130 may detect a touch of the user and at the same time perform a function for displaying a state of the aerosol generating device 1.

FIG. 6 illustrates a process in which infrared light emitted from the infrared light emitter 110 is transmitted to the infrared light receiver 120 through the touch unit 130 and a light transmitter 140. Arrows illustrated in FIG. 6 illustrate an example of a path along which infrared light travels. The light transmitter 140 is located on a travel path of infrared light to guide infrared light emitted from the infrared light emitter 110 and infrared light reflected from the touch unit 130 to the infrared light receiver 120. The light transmitter 140 may be formed of a transparent resin such as acryl or a material such as glass such that infrared light may be guided or visible light may be transmitted.

Referring to FIG. 5 again, the light transmitter 140 includes a diffuser 141 in which infrared light emitted from the infrared light emitter 110 diffuses, a path changer 142 that changes a travel path of infrared light, and a condenser 143 that condenses infrared light moved through the path changer 142.

The diffuser 141 includes, for example, a plurality of lens surfaces and diffuses infrared light emitted from the infrared light emitter 110 by the plurality of lens surfaces. For example, the plurality of lens surfaces may include concave lens surfaces to diffuse infrared light. Also, the plurality of lens surfaces of the diffuser 141 may include spherical lenses or aspherical lenses with refractive surfaces formed of curved surfaces other than spherical surfaces to effectively diffuse infrared light. Through this structure, infrared light moving toward the touch unit 130 may widely diffuse by refractions occurring on the plurality of lenses while passing through the diffuser 141. Therefore, the optical module 100 may include the touch unit 130 having an area wider than an area of infrared light emitted from the infrared light emitter 110. For example, the lens surfaces of the diffuser 141 illustrated in FIG. 5 extend in a direction perpendicular to a longitudinal direction of the optical module 100 and are arranged in the longitudinal direction of the optical module 100. Therefore, infrared light emitted from the infrared light emitter 110 may be refracted on the lens surfaces of the diffuser 141 and diffuse widely. Also, a shape of the touch unit 130 may have a long axis extending in a direction in which infrared light is diffused by the diffuser 141. However, the shape of the touch unit 130 is not limited to this, and instead, may take a different shape as long as the touch unit 130 is capable of performing its functions described above.

The path changer 142 includes an infrared reflection surface that reflects infrared light. A travel path of infrared light emitted from the infrared light emitter 110 and diffused by the diffuser 141 may be changed by the infrared reflection surface and guided to the touch unit 130. A travel path of the infrared light reflected from the touch unit 130 is changed by the infrared reflection surface and guided to the infrared light receiver 120. Similar to the touch unit 130, the infrared reflection surface of the path changer 142 reflects infrared light at a preset ratio with respect to an external medium (e.g., air filled in an empty space inside the aerosol generating device 1). For example, the path changer 142 may have a greater refractive index than air, and thus, infrared light incident on the infrared reflection surface may be totally reflected.

The condenser 143 includes, for example, a plurality of lens surfaces and condenses infrared light reflected from the touch unit 130 by the plurality of lens surfaces. For example, the plurality of lens surfaces may include convex lens surfaces to condense infrared light, and the plurality of lens surfaces of the condenser 143 may include spherical or aspherical lens surfaces to effectively condense infrared light. In contrast to when infrared light is diffused in the diffuser 141, the condenser 143 condenses infrared light by refractions occurring on the plurality of lens surfaces, and the condensed infrared light moves to the infrared light receiver 120.

A surface where reflection and refraction of infrared light occur may be smooth such that reflection and refraction of infrared light may be evenly generated in the touch unit 130 and the light transmitter 140 described above. For example, the surface of the touch unit 130, the lens surfaces of the diffuser 141 of the light transmitter 140, the infrared reflection surface of the path changer 142, and the lens surfaces of the condenser 143 may have surface roughness Ra equal to or less than 1.

Figure 7:
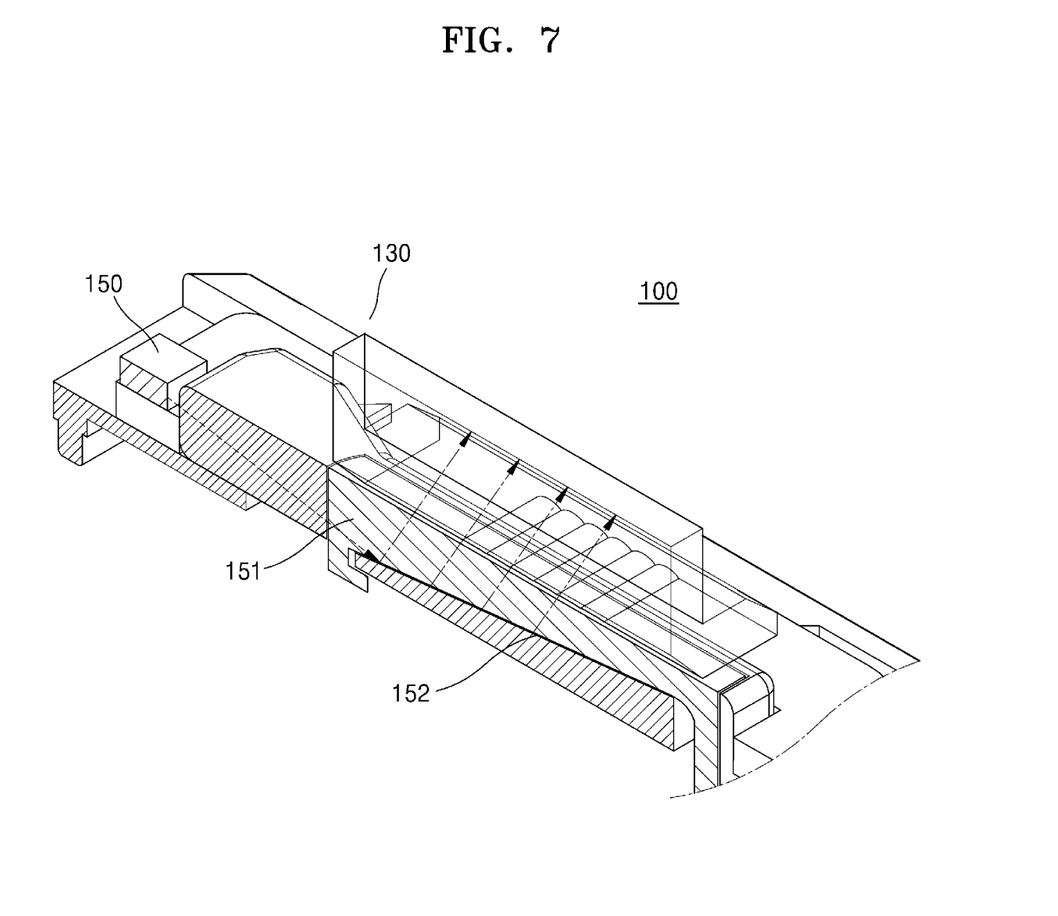
FIG. 7 is a perspective view of a cross section of the optical module according to the embodiments illustrated in FIG. 5, taken along a longitudinal direction.

FIG. 7 is a perspective view of a cross section of an optical module illustrated in FIG. 5, taken along a longitudinal direction.

FIG. 7 illustrates a process in which visible light emitted from the visible light emitter 150 penetrates the touch unit 130 through a visible light transmitter 151. Arrows illustrated in FIG. 7 illustrate an example of a path along which visible light travels. Visible light emitted from the visible light emitter 150 is reflected from a visible light reflection surface 152 and moves toward the touch unit 130. The visible light reflection surface 152 may be a flat mirror or a convex mirror capable of effectively diffusing visible light.

Here, visible light emitted from the visible light emitter 150 is reflected from the visible light reflection surface 152 and passes through the visible light transmitter 151.

The visible light transmitter 151 may include a visible light lens surface that diffuses, by refraction, the visible light reflected from the visible light reflection surface 512. For example, a surface of the visible light transmitter 151 through which visible light reflected from the visible light reflection surface 152 passes may form a lens surface such that the visible light reaches the touch unit 130 in a diffused state. Also, the visible light lens surface may include a spherical or aspherical lens to effectively diffuse visible light.

An incidence angle of infrared light incident on the touch unit 130 may be greater than a critical angle for total internal reflection, and at the same time, an incidence angle of visible light incident on the touch unit 130 may be smaller than the critical angle. When infrared light incident on the touch unit 130 is totally reflected, the amount of infrared light reaching the infrared light receiver 120 increases, compared to when the infrared light incident on the touch unit 130 is not totally reflected. Accordingly, the amount of infrared light reaching the infrared light receiver 120 may change greatly when a touch occurs, and thus, the sensitivity of the touch may be improved.

Figure 8:
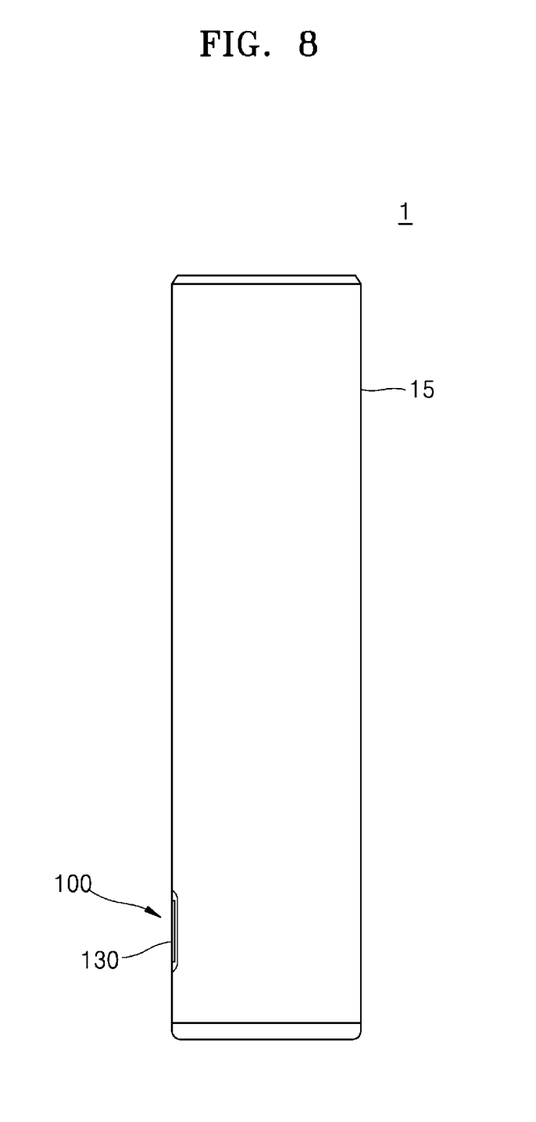
FIG. 8 is a schematic view illustrating an aerosol generating device including an optical module, according to some embodiments.

FIG. 8 is a schematic view illustrating an aerosol generating device including an optical module, according to an embodiment.

Referring to FIG. 8, an aerosol generating device 1 may include a housing 15 forming an exterior of the aerosol generating device 1 and an optical module 100.

The touch unit 130 of the optical module 100 may be exposed on an outer surface of the housing 15 to detect a touch input of a user. Also, the optical module 100 may emit visible light in different colors which respectively represent different internal operation states of the aerosol generating device 1. Also, the optical module 100 may adjust the amount of visible light. However, the emission of visible light is not limited to the example described above and may output a notification to a user in a different fashion. For example, the controller may control the visible light emitter 150 and/or the touch unit to change the color and amount of the visible light A controller 12 may control an operation of the optical module 100. The controller 12 may be included in the aerosol generating device 1 and/or in the optical module 100 to control an operation of the optical module 100.

Figure 9:
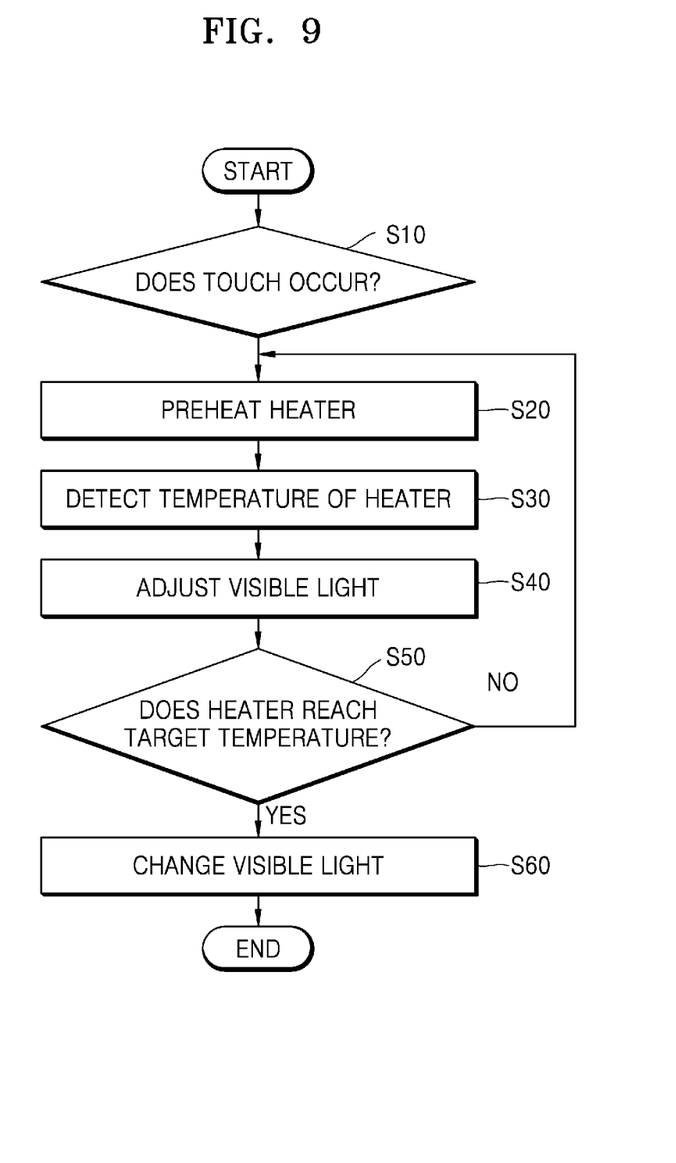
FIG. 9 is a flowchart illustrating an example of a method in which the aerosol generating device according to an embodiment.

FIG. 9 is a flowchart illustrating operations of an aerosol generating device according to an embodiment.

The operation method of the aerosol generating device according to the embodiment illustrated in FIG. 9 includes operations that are processed sequentially in the aerosol generating device 1. Therefore, even if omitted below, the above description of the aerosol generating device 1 may also be applied to the method of FIG. 9.

In operation S10, the controller 12 of the aerosol generating device 1 may determine whether or not a touch occurs on the touch unit 130 by a user. When the touch of the user is input, the controller 12 may control power supplied from the battery 11 to the heater 13 to preheat the heater 13 in operation S20.

The controller 12 may detect a temperature of the heater 13 in operation S30 and control preset visible light to be emitted in operation S40 while the heater 13 is preheated. For example, the touch unit 130 may emit red visible light while the heater 13 is preheated and may increase the amount of visible light as the temperature of the heater 13 increases. Therefore, the user may recognize the preheating status of the heater 13 based on visible light displayed on the touch unit 130.

In operation S50, the controller 12 may determine whether or not the temperature of the heater 13 reaches a target temperature. The heater 13 may be continuously preheated until reaching the target temperature. When the heater 13 reaches the target temperature, a color of visible light that is emitted may be changed in operation S60. For example, the red visible light, which is emitted from the touch unit 13 while the heater 13 is preheated, may be changed to green visible light after the heater 13 reaches the target temperature, such that the user may be notified that preheating is completed.

As described above, the optical module 100 included in the aerosol generating device 1 may perform an input function for receiving a user's touch input and at the same time a display function for displaying a state of the aerosol generating device 1 to the user.

At least one of the components, elements, modules or units (collectively "components" in this paragraph) represented by a block in the drawings such as the controller 12 in FIGS. 1-3 may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

Those of ordinary skill in the art related to the present embodiments may understand that various changes in form and details can be made therein without departing from the scope of the characteristics described above.

The disclosed methods should be considered in descriptive sense only and not for purposes of limitation.

The scope of the present disclosure is defined by the appended claims rather than by the foregoing description, and all differences within the scope of equivalents thereof should be construed as being included in the present disclosure.

The invention claimed is:

1. An optical module comprising:
an infrared light emitter configured to emit infrared light;
an infrared light receiver configured to receive the infrared light emitted from the infrared light emitter and generate a signal based on an amount of the received infrared light;

a touch interface arranged between the infrared light emitter and the infrared light receiver, and configured to reflect the infrared light emitted from the infrared light emitter toward the infrared light receiver, and change an amount of the reflected infrared light as a touch input occurs; and a visible light emitter configured to emit visible light toward the touch interface such that the visible light is emitted out of the optical module by passing through the touch interface.

2. The optical module of claim 1, further comprising a light transmitter configured to guide the infrared light emitted from the infrared light emitter and the infrared light reflected from the touch interface.

3. The optical module of claim 2, wherein the light transmitter comprises:

a diffuser including a lens surface configured to diffuse the infrared light emitted from the infrared light emitter;

a path changer configured to guide the diffused infrared light toward the touch interface, and guide the infrared light reflected from the touch interface toward the infrared light receiver; and a condenser including a lens surface configured to condense the infrared light reflected from the touch interface and guided by the path changer.

4. The optical module of claim 3, wherein the touch interface has a shape with a long axis extending in a direction in which the infrared light emitted from the infrared light emitter is diffused by the diffuser.

5. The optical module of claim 3, wherein the path changer includes an infrared reflection surface configured to change, through reflection, a travel path of the infrared light emitted from the infrared light emitter through reflection.

6. The optical module of claim 5, wherein a surface of the touch interface, the lens surface of the diffuser, the lens surface of the condenser, and the infrared reflection surface of the path changer have surface roughness Ra equal to or less than 1.

7. The optical module of claim 3, wherein the lens surface of the diffuser and the lens surface of the condenser include a spherical lens or an aspherical lens.

8. The optical module of claim 1, further comprising a visible light transmitter configured to guide visible light emitted from the visible light emitter toward the touch interface.

9. The optical module of claim 8, wherein visible light transmitter comprises a visible light reflection surface configured to reflect the visible light emitted from the visible light emitter, and a visible light lens surface configured to diffuse the visible light reflected from the visible light reflection surface.

10. The optical module of claim 9, wherein the visible light lens surface includes a spherical lens or an aspherical lens.

11. The optical module of claim 1, wherein an incidence angle of infrared light incident on the touch interface is greater than a critical angle for total internal reflection, and an incidence angle of visible light incident on the touch interface is smaller than the critical angle.

12. An aerosol generating device generating aerosol from an aerosol generating article, the aerosol generating device comprising the optical module of claim 1.

13. The aerosol generating device of claim 12, further comprising a housing forming an exterior of the aerosol generating device, wherein the touch interface is exposed on an outer surface of the housing.

14. The aerosol generating device of claim 12, further comprising:

a heater configured to heat the aerosol generating article;

a battery configured to supply power to the heater; and a controller configured to, when a touch occurs on the touch interface, control the power supplied to the heater to preheat the heater, and control the touch interface to emit visible light of a preset color.

15. The aerosol generating device of claim 14, wherein the controller controls the touch interface to change the color of the visible light emitted from the touch interface when preheating of the heater is completed.

* * * * *